United States Patent [19]
Yamamoto

[11] Patent Number: 6,038,078
[45] Date of Patent: Mar. 14, 2000

[54] PROJECTION LENS

[75] Inventor: Chikara Yamamoto, Urawa, Japan

[73] Assignee: Fuji Photo Optical Co., Ltd., Omiya, Japan

[21] Appl. No.: 09/377,902

[22] Filed: Aug. 20, 1999

[30] Foreign Application Priority Data

Aug. 24, 1998 [JP] Japan ............................ H10-237258

[51] Int. Cl.$^7$ .................................................. G02B 3/02
[52] U.S. Cl. ........................................................ 359/651
[58] Field of Search .................................. 359/649, 650, 359/651

[56] References Cited

U.S. PATENT DOCUMENTS

Re. 35,310  8/1996  Moskovich .............................. 359/649

FOREIGN PATENT DOCUMENTS 10-62684  3/1998  Japan .

Primary Examiner—Scott J. Sugarman
Attorney, Agent, or Firm—Arnold International; Bruce Y. Arnold

[57] ABSTRACT

The present invention is to a projection lens having three lens groups of positive, negative, and positive refractive power, in order from the enlarging side. The lens is especially suitable for projection televisions that employ a liquid crystal display panel. Because the lens is of the inner focus type, wherein either a single element of the second lens group, or such an element with additional elements of the second lens group that are shifted as a unit during focusing, the focusing mechanism can be small, simple, and fast. Specified conditions are satisfied to ensure that the projection lens is compact and yet has a sufficient back focus to enable other components to be inserted, is telecentric so as to provide an image that does not decrease in intensity at the periphery thereof and provides a bright image with well corrected aberrations.

9 Claims, 8 Drawing Sheets

EMBODIMENT 1

EMBODIMENT 2

INFINITY ON ENLARGING SIDE

MAGNIFYING POWER OF 0.012

FIG. 5

EMBODIMENT 3

INFINITY ON ENLARGING SIDE $F_{NO.} = 2.0$

— e
--- F
-·- C

SPHERICAL ABERRATION $\omega = 10.1°$

— SAGITTAL
--- TANGENTIAL

ASTIGMATISM $\omega = 10.1°$

DISTORTION (%)

MAGNIFYING POWER OF 0.012

$F_{NO.} = 2.0$

— e
--- F
-·- C

SPHERICAL ABERRATION $\omega = 10.2°$

— SAGITTAL
--- TANGENTIAL

ASTIGMATISM

$\omega = 10.2°$

DISTORTION (%)

FIG. 6

EMBODIMENT 4

INFINITY ON ENLARGING SIDE

MAGNIFYING POWER OF 0.012

FIG. 7

EMBODIMENT 5

INFINITY ON ENLARGING SIDE

MAGNIFYING POWER OF 0.012

FIG. 8

PROJECTION LENS

BACKGROUND OF THE INVENTION

A projection lens wherein light is telecentric on the reducing side of the projection lens is desirable for use in a projection television having a liquid crystal display panel. This is because most liquid crystal displays must be illuminated by light that is normal to the back surface of the liquid crystal display for proper operation of the liquid crystal display, and the use of a telecentric lens prevents unnecessary decrease in the image brightness near the periphery of the image. Even where a telecentric optical system is not required, a long back focus is usually required for there to be room to insert the components of a color composite optical system. As a lens to satisfy such a requirement, the one described in, for example, Japanese Laid-open Patent Application H10-62684, is known. This lens provides a telecentric optical system on its reducing side in which distortion is sufficiently corrected. Thus, there is room for inserting the components of a color composite optical system.

However, as the resolution and luminance of images displayed by liquid crystal projectors have increased, this has generated a need for higher resolution and brighter projection lenses. In making a projecting lens have higher resolution and brightness, the lens inevitably becomes larger. If a lens is focused by shifting the entire lens, as described in the above-noted Japanese Laid-open Patent Application H10-62684, the shifting mechanism itself must be larger as the lens become larger. With a larger shifting mechanism, the necessary driving force is increased and speed is decreased.

The adaptation of such a lens to that of the inner focus type, wherein only certain lens groups of the projection lens rather than the projection lens as a whole are shifted, and wherein focusing is made simple is desired so as to solve this problem An inner focus type of lens is well-known in photographic lenses and video camera lenses, but problems have been encountered regarding telecentric characteristics and the length of back focus when adapting a projection lens to be of the inner focus type.

BRIEF SUMMARY OF THE INVENTION

The present invention is a projection lens. Such a lens may be used as an imaging lens of a camera that employs a CCD array, silver film or the like. However, the present invention particularly relates to a projection lens suitable for enlarging a television image displayed on a liquid crystal display.

A first object of the invention is to provide a projection lens of the inner focusing type. A second object of the invention is to provide a projection lens that forms a bright image. A third object of the invention is to provide a projection lens having a back focus that is sufficient to insert an optical system such as a color composite optical system More specifically, an object of the invention is to provide a projection lens that is telecentric on its reducing side and wherein distortion is favorably corrected.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The projection lens of the present invention includes, in order from the enlarging side: a first lens group of positive refractive power, a second lens group of negative refractive power, and a third lens group of positive refractive power. Focusing is carried out by shifting all or a part of the second lens group. Additionally, each of the following Conditions (1)–(4) are satisfied:

| | |
|---|---|
| $-0.65 < F_2/F < -0.20$ | Condition (1) |
| $0.30 < F_3/F < 0.65$ | Condition (2) |
| $0.20 < BF/F < 0.55$ | Condition (3) |
| $0.35 < F_{3FF}/F_3$ | Condition (4) | where $F_2$ is the focal length of the second lens group,

F is the focal length of the projection lens, $F_3$ is the focal length of the third lens group, BF is the back focus of the projection lens, and $F_{3FF}$ is the front focus of the third lens group, i.e., the distance from the surface of the third lens group nearest the enlarging side to the focal position of the third lens group on the enlarging side.

It is also preferable that either the entire second lens group, or at least the portion of the second lens group that shifts, consists of a single lens element and that Condition (5) is satisfied:

| | |
|---|---|
| $0.25 < |F_{2S}/F| < 1.5$ | Condition (5) | wherein $F_{2S}$ is the focal length of component(s) that shifts while focusing, and F is as defined above.

Conditions (1)–(5) will be explained below.

Conditional (1) regulates the power of the second lens group $G_2$ as compared to the projection lens overall. It will be difficult to correct aberrations when the power exceeds the upper limit of Condition (1). If the lower limit is not satisfied, it will be difficult to carry out an inner focus in the second lens group $G_2$.

Condition (2) regulates the power of the third lens group $G_3$ as compared to that of the projection lens. Without Condition (2) being satisfied it will be difficult to correct for aberrations while maintaining a telecentric optical system.

Condition (3) regulates the range of the back focus of the projection lens. If the upper limit is exceeded the back focus becomes long, the lens system becomes large as a whole.

Also, when the lower limit is not satisfied the back focus becomes too short to allow a color composite optical system or the like to be inserted.

Condition (4) regulates the front focus of the third lens group $G_3$. When the lower limit is not satisfied, each lens element of the first lens group $G_1$ on the enlarging side becomes large and it will be difficult to carry out aberration correction while maintaining a telecentric optical system.

Condition (5) regulates the power of the lens element or part of the second lens group that shifts during focusing. In Embodiment 1, the lens element that shifts during focusing is the fifth lens element $L_5$ When the ratio exceeds this upper limit the focal length of the focus lens element becomes long, causing the projection lens as a whole to become large. Also, as the ratio drops below the lower limit the focal length of the focus lens element becomes short, making correction of aberrations difficult.

Moreover, it is preferable that the second lens group have, in order from the enlarging side, a lens element of negative refractive power, a lens element of positive refractive power, and a lens element of negative refractive power.

Five embodiments of the invention will now be described with reference to the drawings, wherein the same reference numerals are used for the same elements, and thus duplicate descriptions of such elements will be omitted.

Embodiment 1

Figure 1:
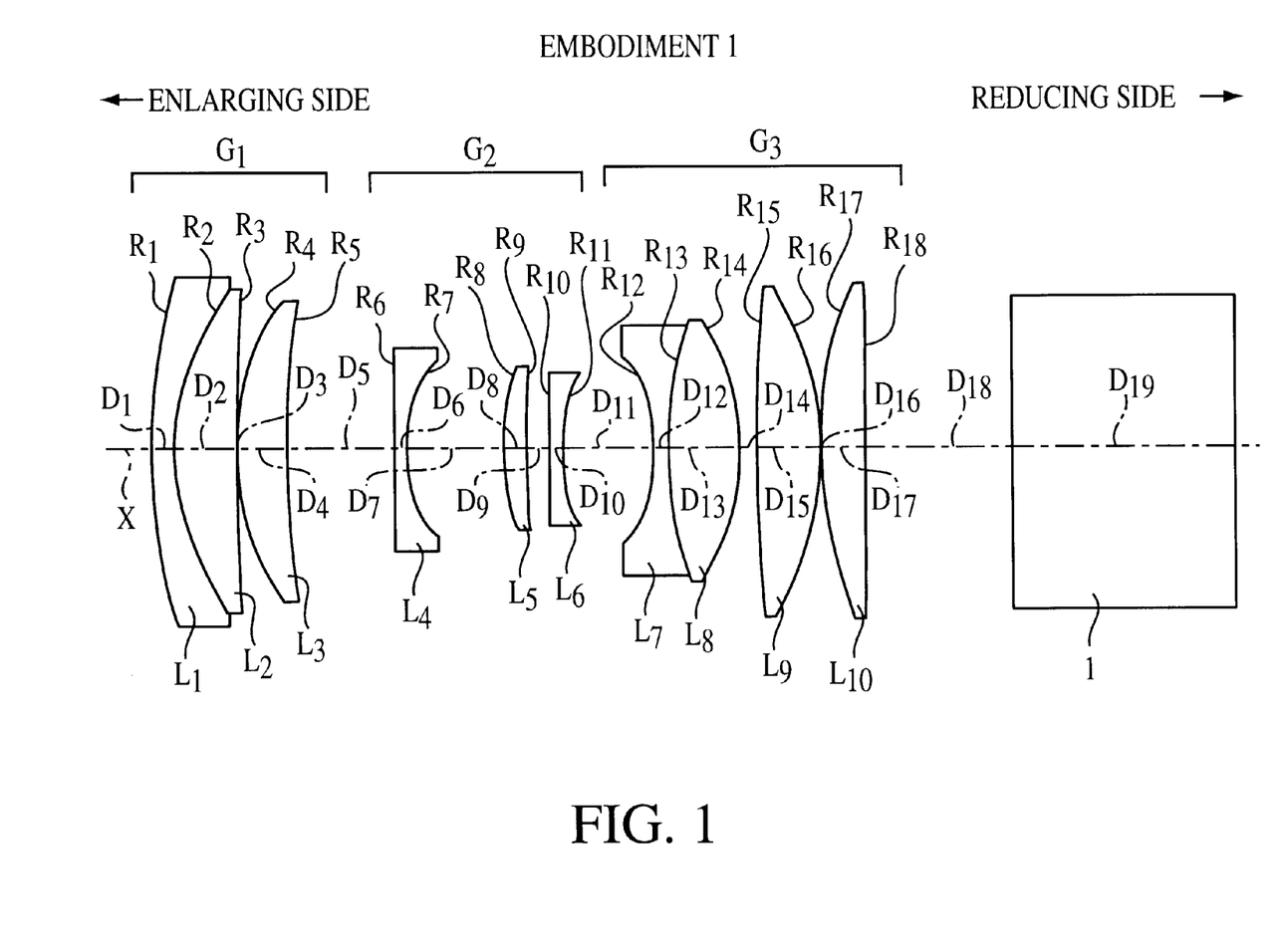
FIG. 1 shows the basic lens element construction of the projecting lens of Embodiment 1.

FIG. 1 shows the basic lens element structure of the projection lens of Embodiment 1. The projecting lens of this embodiment includes, in order from the enlarging side of the projection lens: a first lens group $G_1$ of positive refractive power, a second lens group $G_2$ of negative refractive power, and a third lens group $G_3$ of positive refractive power. Luminous flux that is transmitted through an LCD (not illustrated) positioned on the reducing side of the projection lens is enlarged by the projection lens and projected along optical axis X onto a screen (not illustrated) located on the enlarging side of the lens. Also, a color composite optical system 1 may be arranged on the reducing side of the lens.

The first lens group $G_1$ includes a first lens element $L_1$ formed of a negative meniscus lens with its convex surface on the enlarging side and its concave surface cemented to a second lens element $L_2$ formed of a positive meniscus lens with its convex surface on the enlarging side, and a third lens element $L_3$ formed of a positive meniscus lens with its convex surface on the enlarging side.

The second lens group $G_2$ includes a fourth lens element $L_4$ formed of a negative meniscus lens with its convex surface on the enlarging side, a fifth lens element $L_5$ formed of a positive meniscus lens with its convex surface on the enlarging side, and a sixth lens element $L_6$ formed of a negative meniscus lens with its convex surface on the enlarging side.

The third lens group $G_3$ includes a seventh lens element $L_7$ (formed of a biconcave lens having surfaces of different power, with the surface of smaller radius of curvature on the enlarging side) cemented to an eighth lens element $L_8$ (formed of a biconvex lens having surfaces of different power, with the surface of smaller radius of curvature on the reducing side), a ninth lens element $L_9$ formed of a biconvex lens having surfaces of different power, with the surface of smaller radius of curvature on the reducing side, and a tenth lens element $L_{10}$ formed of a positive meniscus lens with its convex surface on the enlarging side.

In addition, when focusing, only the fifth lens element $L_5$, which forms part of the second lens group $G_2$, shifts. In this way, the number of lens elements shifting during focusing is minimized. Moreover, since this lens element has a small outer diameter as well as a small mass, focusing is made simple. Thus the shifting mechanism itself can be miniaturized, the necessary driving force can be kept small, and focusing can also be done quickly. If the number of lens elements in the second lens group is reduced below three, it becomes difficult to maintain sufficient aberration correction during focusing when moving a single lens element.

Table 1 shows the surface number #, in order from the enlarging side, the radius of curvature R and the axial spacing D of each lens element surface, as well as the refractive index $N_d$ and the Abbe constant $v_d$ (at the d-line) of each lens element of Embodiment 1. Moreover, the radius of curvature R and the axial spacing D are normalized for a projection lens having a focal length F=1.00. The axial spacing D of each lens element surface listed on the same line as a surface number is for the condition where the projection lens is focused at infinity on the enlarging side. Where a lens element moves during focusing, an axial spacing is also listed on the next line below and in parentheses. The axial spacing value shown in parenthesis on the line below lists the surface spacing for a focus position having a magnifying power of 0.012. Also, the bottom part of the table lists the numerical values of the ratios listed in Conditions (1)–(5).

TABLE 1

| # | R | D | $N_d$ | $v_d$ |
|---|---|---|---|---|
| 1 | 0.9966 | 0.0359 | 1.5799 | 40.0 |
| 2 | 0.4234 | 0.1009 | 1.4970 | 81.5 |
| 3 | 3.3677 | 0.0017 | | |
| 4 | 0.4576 | 0.0778 | 1.7432 | 49.3 |
| 5 | 1.9944 | 0.1582 | | |
| 6 | 2.4751 | 0.0221 | 1.4900 | 57.2 |
| 7 | 0.2590 | 0.1514 | | |
| | | (0.1430) | | |
| 8 | 0.3616 | 0.0364 | 1.7429 | 34.5 |
| 9 | 1.3050 | 0.0378 | | |
| | | (0.0462) | | |
| 10 | 3.9804 | 0.0193 | 1.7982 | 25.1 |
| 11 | 0.3350 | 0.1448 | | |
| 12 | −0.2572 | 0.0249 | 1.6727 | 32.1 |
| 13 | 0.7018 | 0.1091 | 1.6204 | 60.3 |
| 14 | −0.4165 | 0.0287 | | |
| 15 | 3.4600 | 0.1005 | 1.6760 | 46.2 |
| 16 | −0.5309 | 0.0017 | | |
| 17 | 0.8230 | 0.0622 | 1.7245 | 37.6 |
| 18 | 8.7736 | 0.2399 | | |
| 19 | ∞ | 0.3317 | 1.5163 | 64.1 |
| 20 | ∞ | | | |
| Condition (1) | $F_2/F$ | −0.40 | | |
| Condition (2) | $F_3/F$ | 0.49 | | |
| Condition (3) | BF/F | 0.46 | | |
| Condition (4) | $F_{3FF}/F_3$ | 0.53 | | |
| Condition (5) | $|F_{2S}/F|$ | 0.66 | | |

As shown in Table 1, Embodiment 1 satisfies Conditions (1)–(5). Moreover, there is sufficient back focus for insertion of additional optical components such as a color composite optical system.

Embodiment 2

The projecting lens of Embodiment 2 is so similar to that of Embodiment 1 that a separate figure has not been provided. The projecting lens of Embodiment 2 differs in that the sixth lens element $L_6$ of Embodiment 2 is a biconcave lens having surfaces of different power, with the surface of smaller radius of curvature on the reducing side. Once again, when focusing, only the fifth lens element $L_5$ (part of the second lens group $G_2$) shifts, and thus Condition (5) regulates the focal length of the fifth lens element $L_5$ in this embodiment.

Table 2 shows the surface number #, in order from the enlarging side, the radius of curvature R and the axial spacing D of each lens element surface, as well as the refractive index $N_d$ and the Abbe constant $v_d$ (at the d-line) of each lens element of Embodiment 2. Moreover, the radius of curvature R and the axial spacing D are normalized for a projection lens having a focal length F=1.00. The axial spacing D of each lens element surface listed on the same line as a surface number is for the condition where the projection lens is focused at infinity on the enlarging side. Where a lens element moves during focusing, an axial spacing is also listed on the next line below and in parentheses. The axial spacing value shown in parenthesis on the fine below fists the surface spacing for a focus position having a magnifying power of 0.012. Also, the bottom part of the table lists the numerical values of the ratios listed in Conditions (1)–(5).

TABLE 2

| # | R | D | $N_d$ | $v_d$ |
|---|---|---|---|---|
| 1 | 0.5541 | 0.0304 | 1.5814 | 40.7 |
| 2 | 0.3727 | 0.1007 | 1.4970 | 81.5 |
| 3 | 4.5188 | 0.0017 | | |
| 4 | 0.3608 | 0.0762 | 1.7158 | 55.7 |
| 5 | 1.1565 | 0.0500 | | |
| 6 | 1.2073 | 0.0221 | 1.4900 | 56.9 |
| 7 | 0.2227 | 0.0939 | | |
| | | (0.0832) | | |
| 8 | 0.3839 | 0.0312 | 1.6396 | 57.1 |
| 9 | 0.7376 | 0.0512 | | |
| | | (0.0619) | | |
| 10 | −6.8188 | 0.0194 | 1.6337 | 34.7 |
| 11 | 0.3373 | 0.1684 | | |
| 12 | −0.2671 | 0.0249 | 1.6727 | 32.1 |
| 13 | 0.5048 | 0.1052 | 1.6204 | 60.3 |
| 14 | −0.4646 | 0.0017 | | |
| 15 | 1.3871 | 0.0893 | 1.7132 | 39.5 |
| 16 | −0.5841 | 0.1302 | | |
| 17 | 0.6003 | 0.0487 | 1.7523 | 32.9 |
| 18 | 1.3692 | 0.0830 | | |
| 19 | ∞ | 0.3322 | 1.5163 | 64.1 |
| 20 | ∞ | | | |
| Condition (1) | $F_2/F$ | −0.31 | | |
| Condition (2) | $F_3/F$ | 0.52 | | |
| Condition (3) | BF/F | 0.30 | | |
| Condition (4) | $F_{3FF}/F_3$ | 0.55 | | |
| Condition (5) | $|F_{2S}/F|$ | 1.21 | | |

As shown in Table 2, Embodiment 2 satisfies Conditions (1)–(5). Moreover, there is sufficient back focus for insertion of additional optical components such as a color composite optical system Embodiment 3

Figure 2:
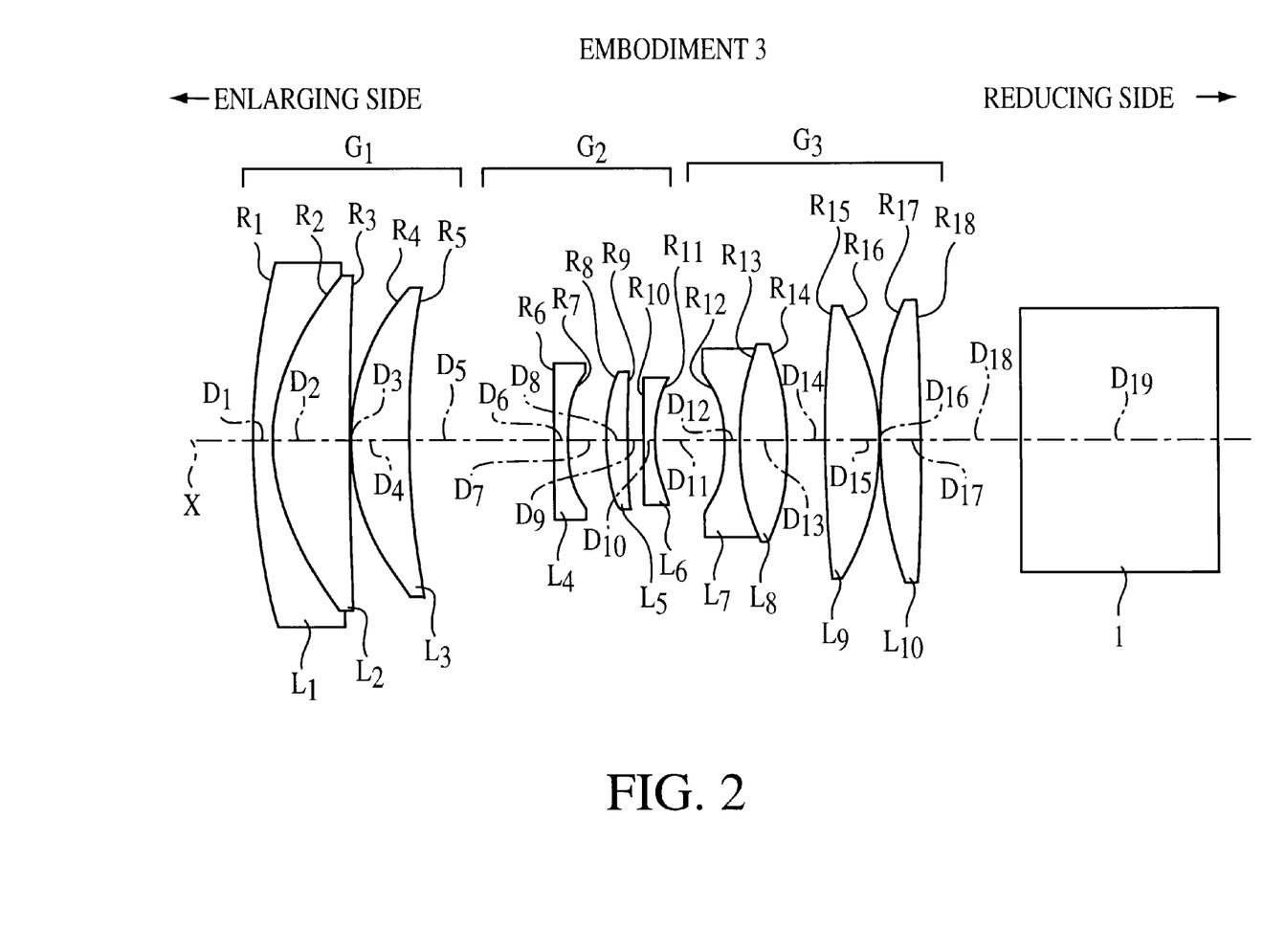
FIG. 2 shows the basic lens element construction of the projecting lens of Embodiment 3.

FIG. 2 shows the basic lens element structure of a projection lens according to Embodiment 3 of the invention. The projection lens of Embodiment 3 has about the same structure as in Embodiment 1, except that the tenth lens element $L_{10}$ is replaced with a biconvex lens having surfaces of different power, with the surface of a smaller radius of curvature on the enlarging side. In this embodiment, instead of the fifth lens element shifting when focusing, the sixth lens element $L_6$ (part of the second lens group $G_2$) shifts, and thus Condition (5) regulates the focal length of the sixth lens element $L_6$.

Table 3 shows the surface number #, in order from the enlarging side, the radius of curvature R and the axial spacing D of each lens element surface, as well as the refractive index $N_d$ and the Abbe constant $v_d$ (at the d-line) of each lens element of Embodiment 3. Moreover, the radius of curvature R and the axial spacing D are normalized for a projection lens having a focal length F=1.00. The axial spacing D of each lens element surface listed on the same line as a surface number is for the condition where the projection lens is focused at infinity on the enlarging side. Where a lens element moves during focusing, an axial spacing is also listed on the next line below and in parentheses. The axial spacing value shown in parenthesis on the line below lists the surface spacing for a focus position having a magnifying power of 0.012. Also, the bottom part of the table lists the numerical values of the ratios listed in Conditions (1)–(5).

TABLE 3

| # | R | D | $N_d$ | $v_d$ |
|---|---|---|---|---|
| 1 | 1.5146 | 0.0358 | 1.5814 | 40.7 |
| 2 | 0.4546 | 0.1286 | 1.4970 | 81.5 |
| 3 | 14.0250 | 0.0017 | | |
| 4 | 0.4552 | 0.0952 | 1.7301 | 55.0 |
| 5 | 1.9178 | 0.2448 | | |
| 6 | 97.2744 | 0.0221 | 1.5471 | 48.2 |
| 7 | 0.2377 | 0.0727 | | |
| 8 | 0.3109 | 0.0385 | 1.7618 | 31.4 |
| 9 | 2.3582 | 0.0221 | | |
| | | (0.0304) | | |
| 10 | 2.0852 | 0.0193 | 1.7128 | 29.4 |
| 11 | 0.3063 | 0.1173 | | |
| | | (0.1090) | | |
| 12 | −0.2429 | 0.0248 | 1.6780 | 31.6 |
| 13 | 0.4491 | 0.0859 | 1.6204 | 60.3 |
| 14 | −0.4456 | 0.0689 | | |
| 15 | 3.0482 | 0.0870 | 1.6560 | 52.2 |
| 16 | −0.5046 | 0.0017 | | |
| 17 | 0.7529 | 0.0670 | 1.7025 | 41.3 |
| 18 | −7.3116 | 0.1661 | | |
| 19 | ∞ | 0.3312 | 1.5163 | 64.1 |
| 20 | ∞ | | | |
| Condition (1) | $F_2/F$ | −0.48 | | |
| Condition (2) | $F_3/F$ | 0.47 | | |
| Condition (3) | BF/F | 0.38 | | |
| Condition (4) | $F_{3FF}/F_3$ | 0.47 | | |
| Condition (5) | $|F_{2S}/F|$ | 0.51 | | |

As shown in Table 3, Embodiment 3 satisfies Conditions (1)–(5). Moreover, there is sufficient back focus for insertion of additional optical components such as a color composite optical system.

Embodiment 4

The projecting lens of Embodiment 4 is so similar to that of Embodiment 3 that a separate figure has not been provided. The projecting lens of Embodiment 4 differs in that the fourth lens element $L_4$ of Embodiment 4 is a biconcave lens having surfaces of different power, with the surface of smaller radius of curvature on the reducing side, and the tenth lens element $L_{10}$ of Embodiment 4 is a positive meniscus lens with its convex surface on the enlarging side. Once again, when focusing, the sixth lens element $L_6$ (part of the second lens group $G_2$) shifts, and thus Condition (5) regulates the focal length of the sixth lens element $L_6$.

Table 4 shows the surface number #, in order from the enlarging side, the radius of curvature R and the axial spacing D of each lens element surface, as well as the refractive index $N_d$ and the Abbe constant $v_d$ (at the d-line) of each lens element of Embodiment 4. Moreover, the radius of curvature R and the axial spacing D are normalized for a projection lens having a focal length F=1.00. The axial spacing D of each lens element surface listed on the same line as a surface number is for the condition where the projection lens is focused at infinity on the enlarging side. Where a lens element moves during focusing, an axial spacing is also listed on the next line below and in parentheses. The axial spacing value shown in parenthesis on the line below lists the surface spacing for a focus position having a magnifying power of 0.012. Also, the bottom part of the table lists the numerical values of the ratios listed in Conditions (1)–(5).

TABLE 4

| # | R | D | $N_d$ | $v_d$ |
|---|---|---|---|---|
| 1 | 1.2563 | 0.0496 | 1.5814 | 40.7 |
| 2 | 0.4463 | 0.1824 | 1.4970 | 81.5 |
| 3 | 12.0837 | 0.0017 | | |
| 4 | 0.4186 | 0.1333 | 1.5950 | 61.3 |
| 5 | 2.3358 | 0.2248 | | |
| 6 | −2.7687 | 0.0221 | 1.5371 | 57.7 |
| 7 | 0.2274 | 0.0647 | | |
| 8 | 0.3060 | 0.0441 | 1.7598 | 31.7 |
| 9 | 5.2947 | 0.0220 | | |
| | | (0.0308) | | |
| 10 | 2.1129 | 0.0193 | 1.7144 | 29.3 |
| 11 | 0.3018 | 0.1212 | | |
| | | (0.1124) | | |
| 12 | −0.2292 | 0.0248 | 1.7180 | 29.9 |
| 13 | 0.4935 | 0.0896 | 1.6204 | 60.3 |
| 14 | −0.4081 | 0.0437 | | |
| 15 | 3.5109 | 0.0976 | 1.6663 | 49.1 |
| 16 | −0.4402 | 0.0017 | | |
| 17 | 0.6401 | 0.0702 | 1.6798 | 45.1 |
| 18 | 26.5577 | 0.1299 | | |
| 19 | ∞ | 0.3583 | 1.5163 | 64.1 |
| 20 | ∞ | | | |
| Condition (1) | | $F_2/F$ | −0.46 | |
| Condition (2) | | $F_3/F$ | 0.44 | |
| Condition (3) | | $BF/F$ | 0.37 | |
| Condition (4) | | $F_{3FF}/F_3$ | 0.47 | |
| Condition (5) | | $|F_{2S}/F|$ | 0.50 | |

As shown in Table 4, Embodiment 4 satisfies Conditions (1)–(5). Moreover, there is sufficient back focus for insertion of additional optical components such as a color composite optical system.

Embodiment 5

Figure 3:
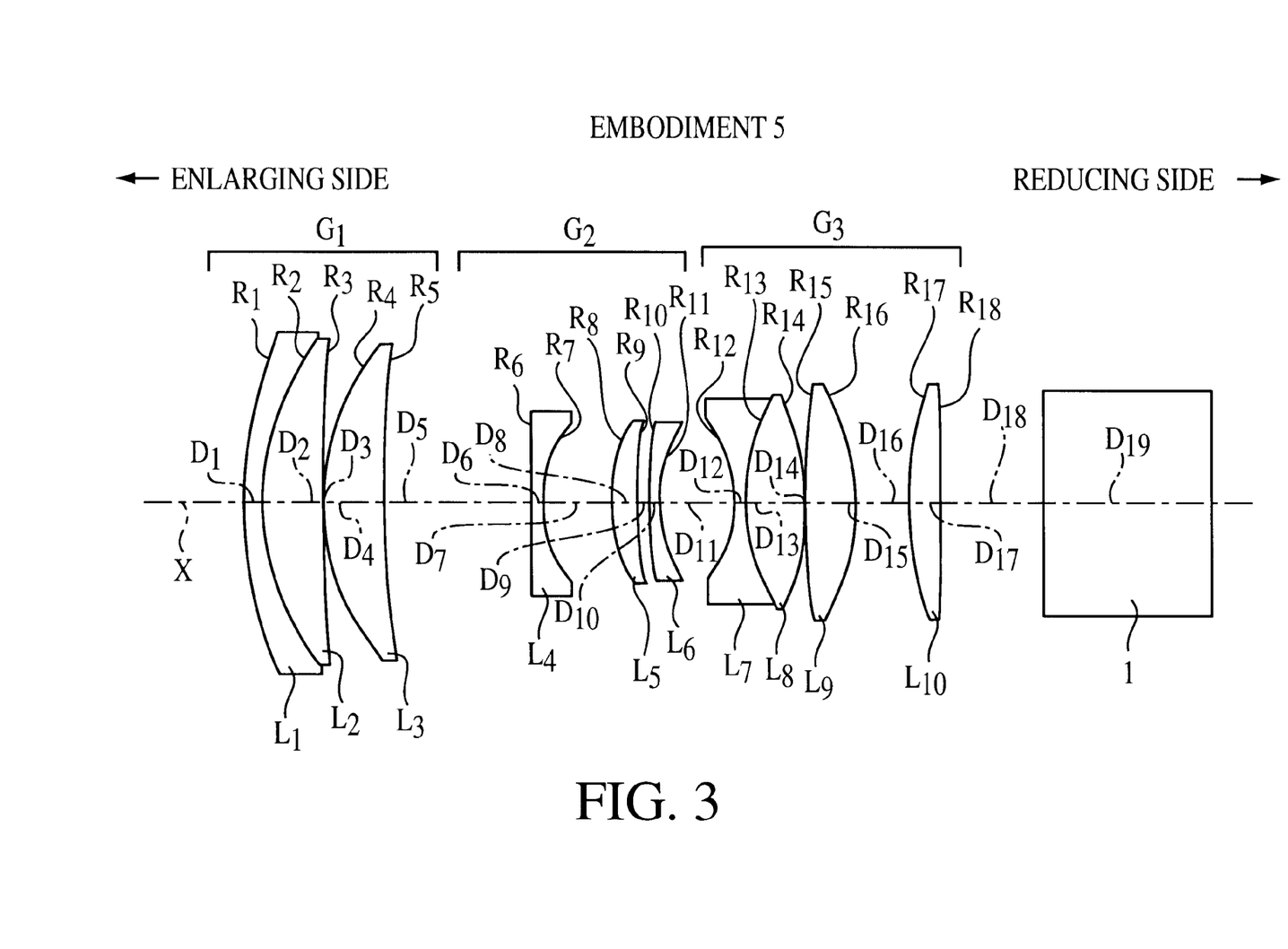
FIG. 3 shows the basic lens element construction of the projecting lens of Embodiment 5.
Figure 4:
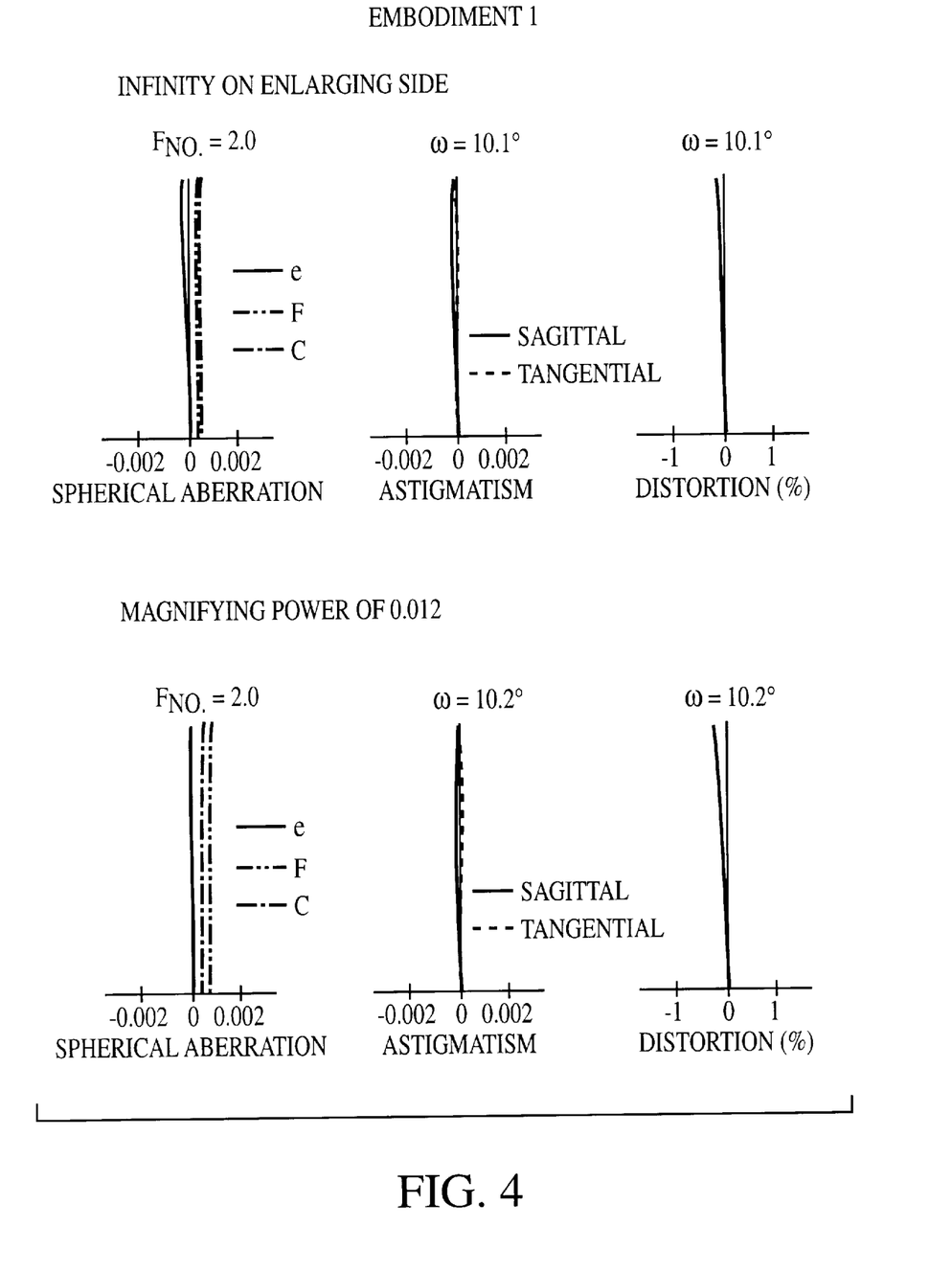
FIG. 4 shows the spherical aberration, astigmatism, and distortion of the projection lens of Embodiment 1.
Figure 5:
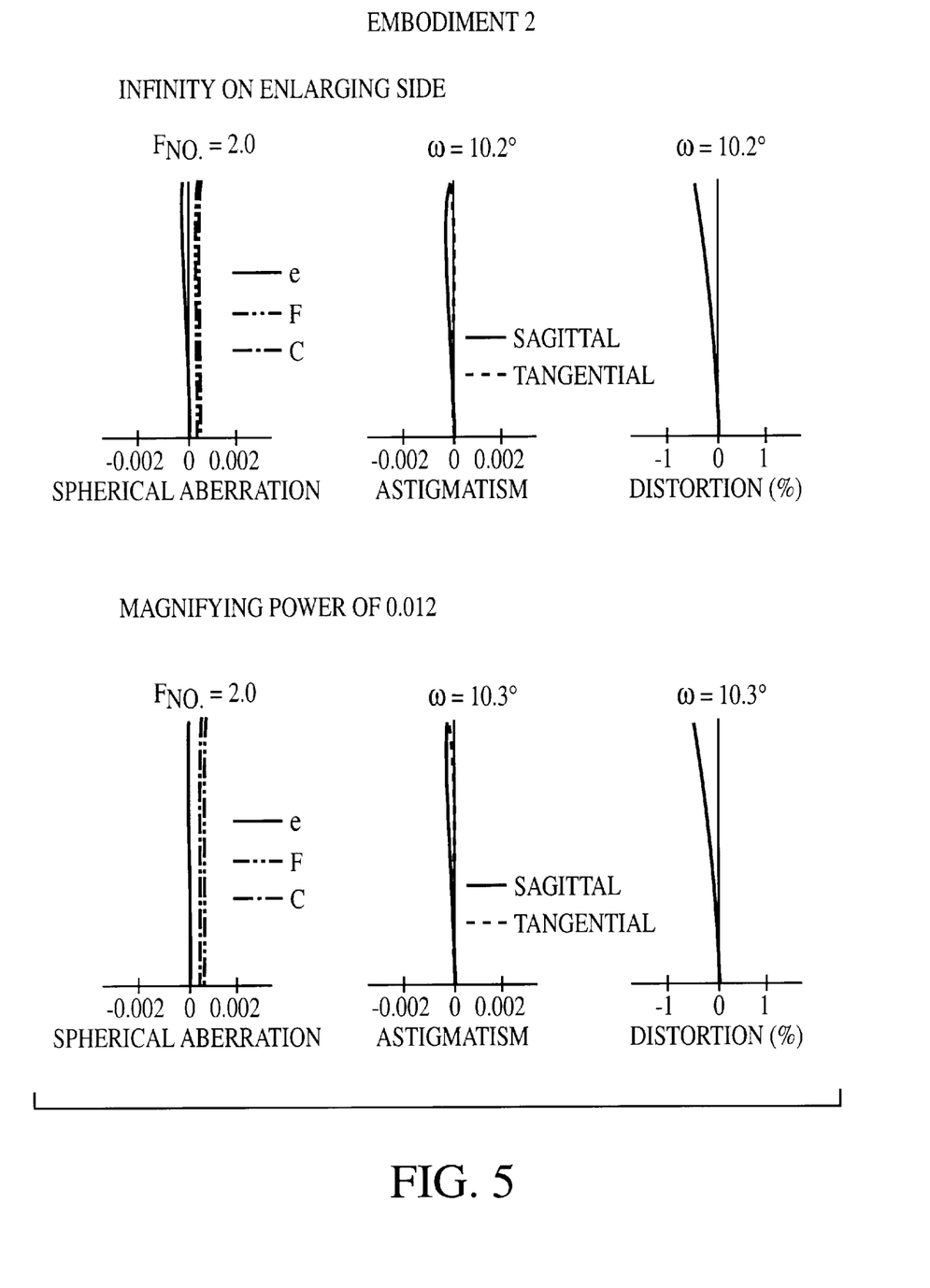
FIG. 5 shows the spherical aberration, astigmatism, and distortion of the projection lens of Embodiment 2.
Figure 6:
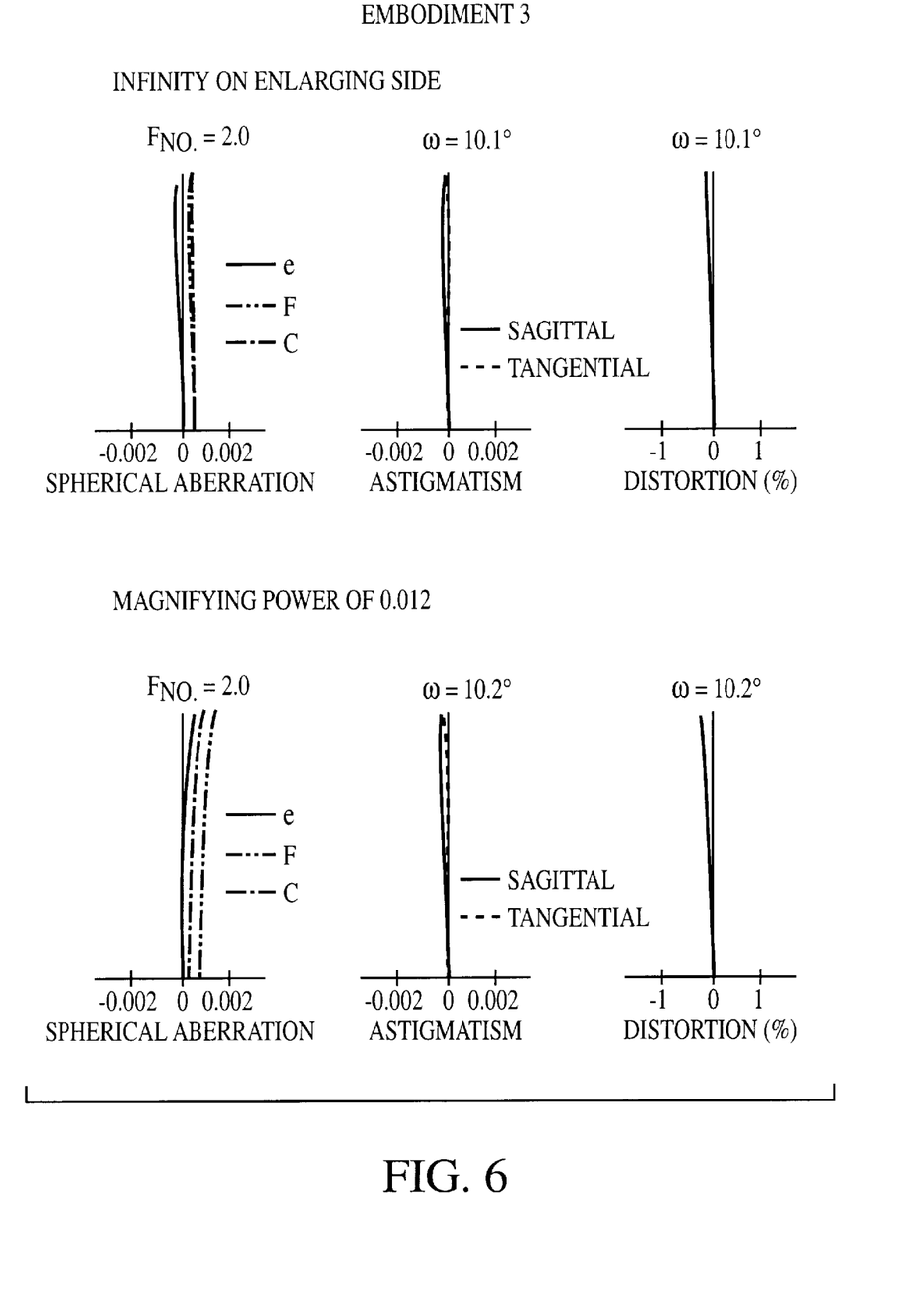
FIG. 6 shows the spherical aberration, astigmatism, and distortion of the projection lens of Embodiment 3.
Figure 7:
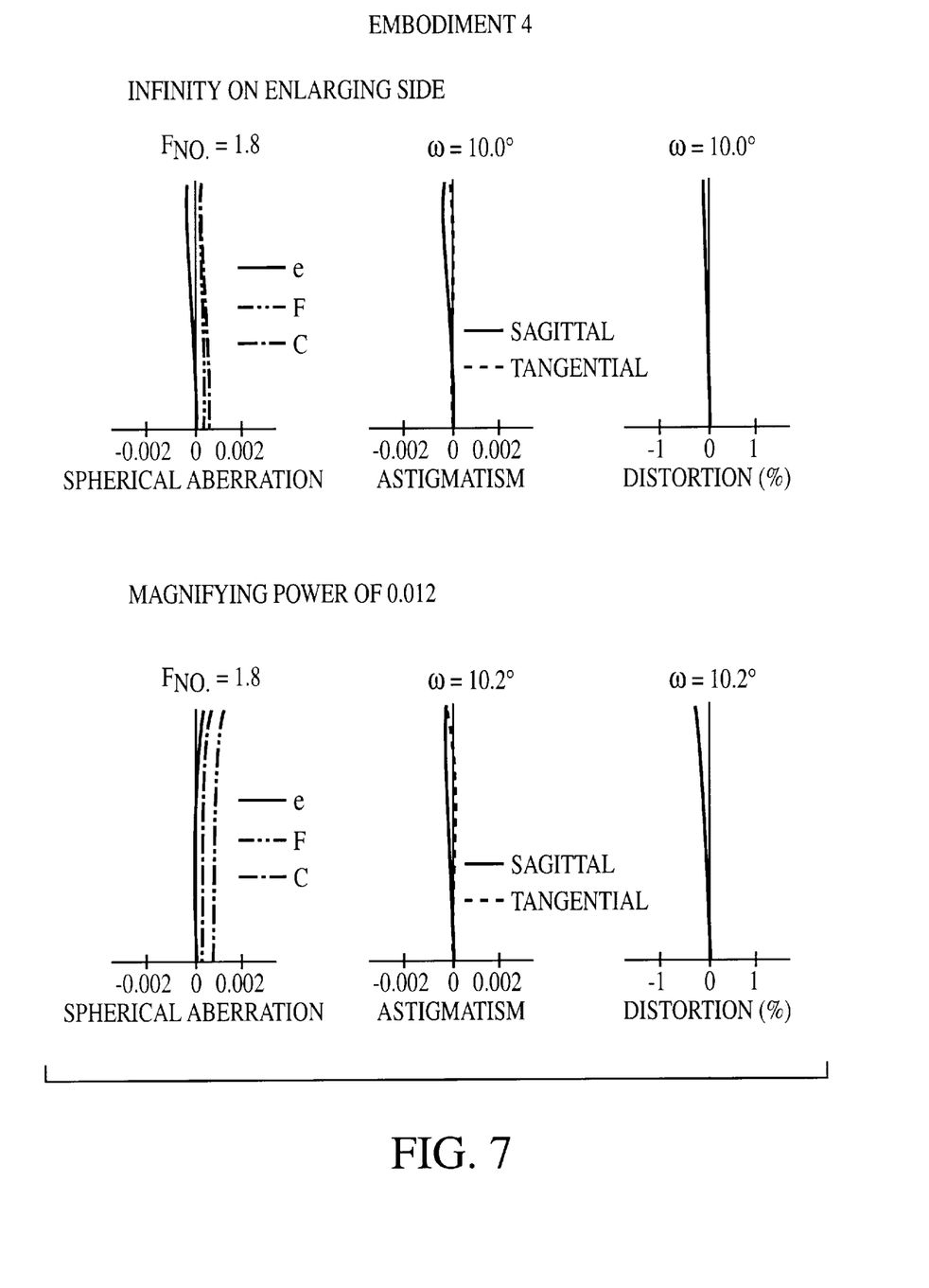
FIG. 7 shows the spherical aberration, astigmatism, and distortion of the projection lens of Embodiment 4.
Figure 8:
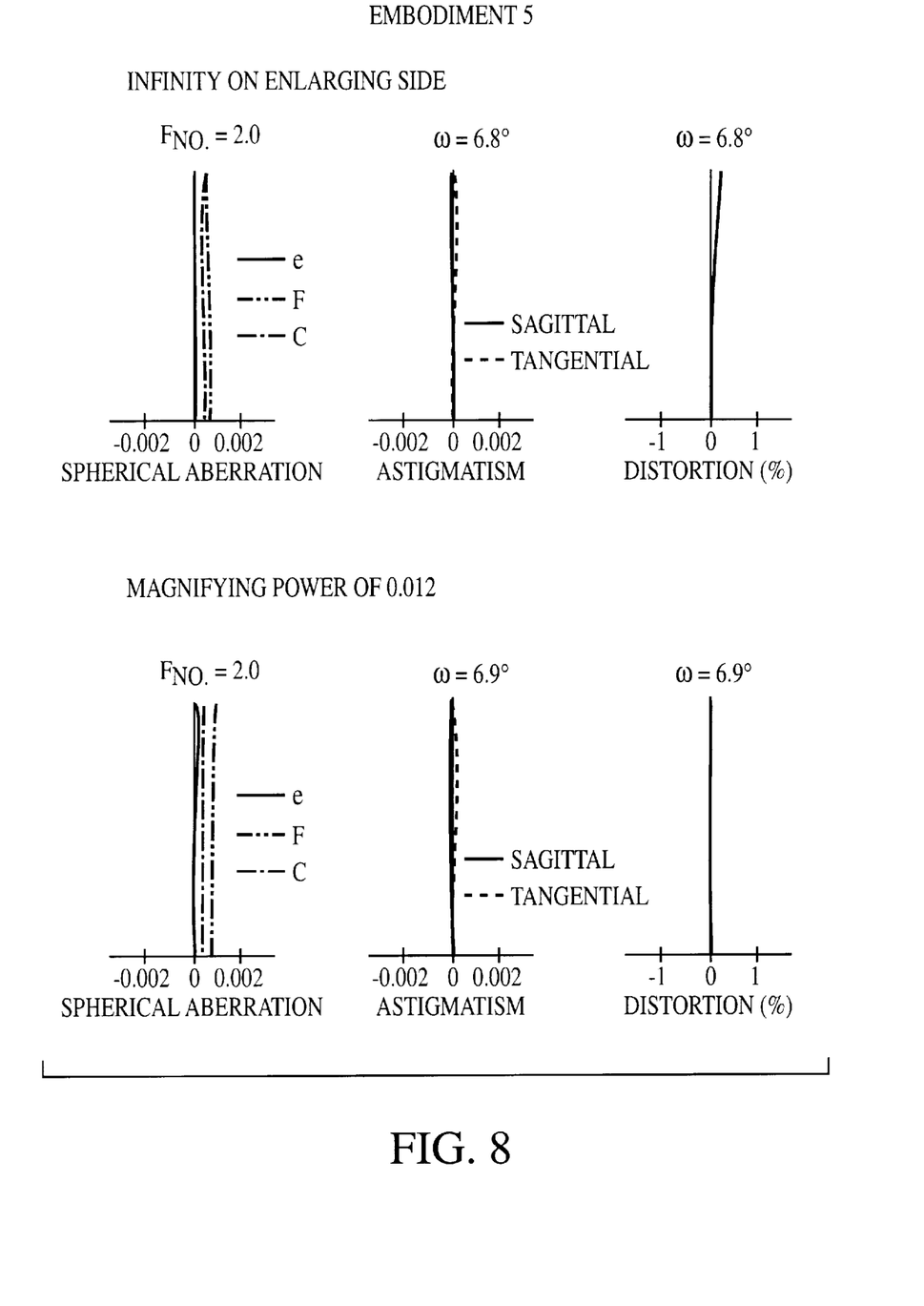
FIG. 8 shows the spherical aberration, astigmatism, and distortion of the projection lens of Embodiment 5.

FIG. 3 shows the basic lens element structure of a projecting lens according to Embodiment 5 of the invention. Embodiment 5 has about the same structure as in Embodiment 1 but is different in that the fourth lens element $L_4$ is a biconcave lens having surfaces of different power with the surface of smaller radius of curvature on the reducing side, and the eighth lens element $L_8$ of Embodiment 5 is a biconvex lens having surfaces of different power with the surface of smaller radius of curvature on the enlarging side. Once again, when focusing, the sixth lens element $L_6$ (part of the second lens group $G_2$) shifts, and thus Condition (5) regulates the focal length of the sixth lens element $L_6$.

Table 5 shows the surface number #, in order from the enlarging side, the radius of curvature R and the axial spacing D of each lens element surface, as well as the refractive index $N_d$ and the Abbe constant $v_d$ (at the d-line) of each lens element of Embodiment 5. Moreover, the radius of curvature R and the axial spacing D are normalized for a projection lens having a focal length F=1.00. The axial spacing D of each lens element surface listed on the same line as a surface number is for the condition where the projection lens is focused at infinity on the enlarging side. Where a lens element moves during focusing, an axial spacing is also listed on the next line below and in parentheses. The axial spacing value shown in parenthesis on the line below lists the surface spacing for a focus position having a magnifying power of 0.012. Also, the bottom part of the table lists the numerical values of the ratios listed in Conditions (1)–(5).

TABLE 5

| # | R | D | $N_d$ | $v_d$ |
|---|---|---|---|---|
| 1 | 0.7173 | 0.0241 | 1.7153 | 29.2 |
| 2 | 0.4152 | 0.0819 | 1.4970 | 81.5 |
| 3 | 3.3813 | 0.0011 | | |
| 4 | 0.3881 | 0.0766 | 1.6985 | 56.6 |
| 5 | 1.6749 | 0.2108 | | |
| 6 | −17.3998 | 0.0149 | 1.4900 | 56.9 |
| 7 | 0.1875 | 0.0932 | | |
| 8 | 0.2480 | 0.0353 | 1.7110 | 39.8 |
| 9 | 0.8995 | 0.0174 | | |
| | | (0.0244) | | |
| 10 | 1.2516 | 0.0130 | 1.7486 | 33.1 |
| 11 | 0.2376 | 0.0962 | | |
| | | (0.0892) | | |
| 12 | −0.2148 | 0.0167 | 1.6156 | 47.9 |
| 13 | 0.3189 | 0.0835 | 1.6204 | 60.3 |
| 14 | −0.3962 | 0.0011 | | |
| 15 | 1.4757 | 0.0663 | 1.4970 | 81.5 |
| 16 | −0.3590 | 0.0766 | | |
| 17 | 0.5152 | 0.0431 | 1.5600 | 43.7 |
| 18 | 14.8678 | 0.1448 | | |
| 19 | ∞ | 0.2230 | 1.5163 | 64.1 |
| 20 | ∞ | | | |
| Condition (1) | | $F_2/F$ | −0.32 | |
| Condition (2) | | $F_3/F$ | 0.45 | |
| Condition (3) | | $BF/F$ | 0.29 | |
| Condition (4) | | $F_{3FF}/F_3$ | 0.57 | |
| Condition (5) | | $|F_{2S}/F|$ | 0.39 | |

As shown in Table 5, Embodiment 5 satisfies Conditions (1)–(5). Moreover, there is sufficient back focus for insertion of additional optical components such as a color composite optical system FIGS. 4–8 show the spherical aberration, astigmatism and distortion of Embodiments 1–5, respectively, with the lens focused at infinity on the enlarging side (top portion), and with it focused so as to have a magnifying power of 0.012 on the enlarging side (bottom portion). In these figures, ω indicates the half-image angle. The abscissa values given for Spherical Aberration and Astigmatism are for a lens with its focal length normalized to unity. As clearly shown in FIGS. 4–8, the projecting lenses of Embodiments 1–5 provide a bright image (since the F-numbers are in the range 1.8–2.0) and enable the various aberrations illustrated to be favorably corrected for image angles 2c in the range from about 14–20 degrees.

The projecting lens of the present invention is particularly advantageous in projection televisions which can switch the viewing format or magnification by selecting one from among a plurality of projecting lenses that can be selectively inserted in the light path from a liquid crystal display to the viewing screen. This is due to its having a long focal length relative to the size of an imaging element and its being a fixed focus lens with a relatively small angle of view. Furthermore, since the above-mentioned second lens group $G_2$ is formed of a plurality of lens elements, it is also possible to move one or more elements thereof as a unit during focusing. Thus, focusing can be carried out by using a single driving mechanism enabling the shifting mechanism to be simple.

The invention being thus described, it will be obvious that the same may be varied in many ways. For example, the radius of curvature R of each lens element and the surface spacings D can be appropriately altered. Also, in the above-noted embodiments, the lens of the present invention is used as a projecting lens of a liquid crystal display panel but the present invention can also be used as an imaging lens for various types of cameras and the like. Such variations are not to be regarded as a departure from the spirit and scope of the invention. Rather the scope of the invention shall defined as set forth in the following claims and their legal equivalents. All such modifications as would be obvious to one skilled in the art are intended to be included within the scope of the following claims.

What is claimed is:

1. A projection lens comprising, in order from the enlarging side:

a first lens group having positive refractive power;

a second lens group having negative refractive power, all or a part of said second lens group shifting in order to carry out focusing of said projection lens; and a third lens group having positive refractive power;

wherein the following condition is satisfied:

$-0.65 < F_2/F < -0.20;$ where $F_2$ is the focal length of the second lens group, and F is the focal length of the projection lens.

2. The projection lens of claim 1, and further satisfying the following condition:

$0.30 < F_3/F < 0.65;$ where $F_3$ is the focal length of the third lens group.

3. The projection lens of claim 2, and further satisfying the following condition:

$0.20 < BF/F < 0.55$ where

BF is the back focus of the projection lens.

4. The projection lens of claim 3, and further satisfying the following condition:

$0.35 < F_{3FF}/F_3$ where $F_{3FF}$ is the distance from the surface of the third lens group closest to the enlarging side to the focal position on the enlarging side of the third lens group.

5. The projecting lens of claim 1, wherein only a single lens element of the second lens group shifts when focusing, and the following condition is satisfied:

$0.25 < |F_{2S}/F| < 1.5$ where $F_{2S}$ is the focal length of the lens element which shifts while focusing.

6. The projecting lens of claim 1, said second lens group consisting of, in order from the enlarging side: a lens element of negative refractive power, a lens element of positive refractive power, and a lens element of negative refractive power.

7. The projecting lens of claim 2, said second lens group consisting of, in order from the enlarging side: a lens element of negative refractive power, a lens element of positive refractive power, and a lens element of negative refractive power.

8. The projecting lens of claim 3, said second lens group consisting of, in order from the enlarging side: a lens element of negative refractive power, a lens element of positive refractive power, and a lens element of negative refractive power.

9. The projecting lens of claim 4, said second lens group consisting of, in order from the enlarging side: a lens element of negative refractive power, a lens element of positive refractive power, and a lens element of negative refractive power.

* * * * *

UNITED STATES PATENT AND TRADEMARK OFFICE
CERTIFICATE OF CORRECTION

PATENT NO : 6,038,078
DATED : Mar. 14, 2000
INVENTOR(S): YAMAMOTO

It is certified that error appears in the above-identified patent and that said Letters Patent are hereby corrected as shown below:

At col. 8, line 51, change "2c" to $--2\omega--$

Signed and Sealed this

Twenty-fourth Day of April, 2001

*Attest:*

NICHOLAS P. GODICI

*Attesting Officer*   *Acting Director of the United States Patent and Trademark Office*